Oct. 17, 1961

G. LEWIS

BONE CONDUCTION RECEIVER MOUNTING FOR COMBINED HEARING AID AND SPECTACLE

Original Filed Sept. 24, 1956

Re. 25,059

INVENTOR

GEORGE LEWIS

BY Henry L. Burkitt

ATTORNEY

United States Patent Office

Re. 25,059
Reissued Oct. 17, 1961

25,059

BONE CONDUCTION RECEIVER MOUNTING FOR COMBINED HEARING AID AND SPECTACLE

George Lewis, Manchester, England, assignor, by mesne assignments, to Otarion Listener Corporation, Scarborough Park, N.Y., a corporation of New York Original No. 2,858,376, dated Oct. 28, 1958, Ser. No. 611,590, Sept. 24, 1956. Application for reissue Oct. 7, 1959, Ser. No. 853,668
Claims priority, application France Mar. 14, 1956
17 Claims. (Cl. 179—107)

Figure 1:
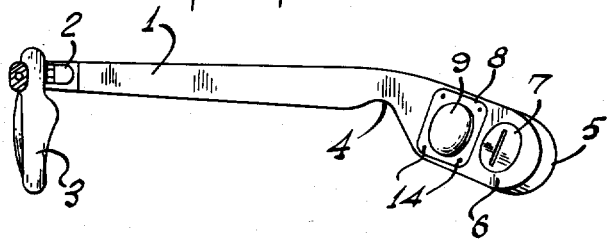

Matter enclosed in heavy brackets [ ] appears in the original patent but forms no part of this reissue specification; matter printed in italics indicates the additions made by reissue.

The present invention relates to improvements in hearing aid apparatus of the type in which a hearing aid device is combined with spectacles.

More specifically, it relates to improvements in the method of mounting [used for securing] a bone conduction receiver to *secure it to* the frame of the spectacles, in the case [when] *where* such as a receiver is employed *as a part of* [in] the hearing aid [part of the] apparatus.

It will first be recalled that a "hearing aid" is a device provided for facilitating perception of sounds to hard-of-hearing persons, and that it essentially consists of a microphone, [followed by] an amplifier and a [telephone] receiver, or a bone conduction receiver, together with [auxiliary] elements for *providing an* [the] electric power *source,* [supply thereof] and for adjustment or regulation of the *volume* [power] of *the* amplified sounds. A bone conduction receiver is an electromechanical device *for* transforming electric currents into mechanical vibrations, and *for* transmitting the latter to the bones of the skull *in the vicinity of the ear* of the wearer of the apparatus [, in the vicinity of his ear]. This process of transmitting sounds to the inner ear of a deaf person is known to give good results in many instances where the inner ear is in reasonably good condition, although the middle ear may be seriously defective.

It is also known that hearing aids of either type—air conduction or bone conduction—may be built in the shape of spectacles, with the various parts of the equipment housed inside the frame of said spectacles, the side bows of said frame then being usually broader and thicker than those of ordinary spectacles, *owing* [due] to the necessity *for* [of] allowing sufficient space for accommodating the various parts of the *amplifier* [amplifying equipment]. In this case, to keep the bulk of the device at a minimum, a transistor amplifier is [generally] used, mainly because of its reduced battery power supply requirements and consequent size reduction. The microphone is secured to one side bow of the spectacle frame, for instance, the left one. *The* [, while the] bone conduction receiver *may be* [is] secured to the other side bow, to avoid *the* interaction effects between them [,] *which* possibly *may result* [resulting] in the sustained oscillation phenomenon known as "acoustic feedback."

It has long been known *that it is* desirable to mount the microphone on the frame "elastically" or "floating," as this obviously avoids subjecting it to mechanical vibrations other than sounds. [However, experience] *Experience* has shown that [the] parasitic coupling [which] may exist between a microphone and a bone conduction receiver, *even where one is* [respectively] secured to one end and *the other* to the other of the side bows of a spectacle frame, [is not completely eliminated by such a simple arrangement,] and that a certain amount of mechanical coupling still persists through the front piece of the spectacles, eventually resulting in detrimental effects. The object of the present invention is a method of

*mounting a* bone conduction receiver [mounting, the purpose of] which *suppresses* [is suppressing], or at least significantly *reduces,* [reducing the said] parasitic coupling *or mechanical feedback between microphone and receiver.*

[According to the present invention, there is provided a method of mounting] *In the structure here described,* a bone conduction receiver *is mounted* on one side bow of the frame of a combined spectacles and hearing aid, *and* [in which] said bow is provided, on *its* [the] inner side [thereof], i.e., on that side which faces the wearer's head, with an aperture through which *the* [said] bone conduction receiver *may protrude in order to engage against* [protrudes and comes into contact with] the [said] wearer's head, and *wherein the* [in which] said receiver is secured to *the* [said] bow through the agency of a resilient material, for instance, a rubber sheet, to which *the receiver* [it] is firmly secured. *The resilient* [, said] metal [being] *may be* secured to the edges of *the* [said] aperture, and preferably *is* stretched *from said edges across the aperture. The* [thereon, and said] receiver *is then held centered by the material* [being so centered] with respect to *the* [said] aperture [as] to avoid any direct mechanical contact between [said] *the* frame and receiver.

Further particulars and advantages of the invention will be better understood from the following detailed description of an embodiment thereof, made with reference to the annexed drawings, in which:

FIGURE 1 is *an elevational* [a partial perspective] view of a combined hearing aid and spectacles [.] *shown open for use, but cut down the center of the bridge to show only one bow;*

Figure 2:
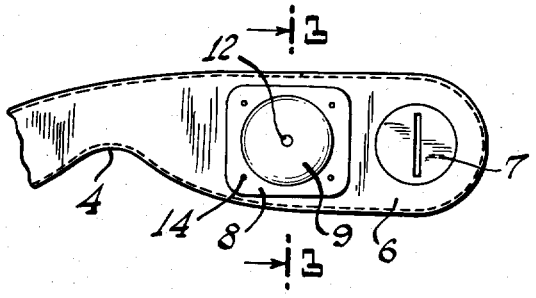

FIGURE 2 *is a detail elevational view, to enlarge scale, of* [shows, with more detail,] a part of [a] *the* side bow of a spectacle frame to which a bone conduction receiver is fitted, this part of said side bow being that *part* which rests on the external ear of the wearer [.]*; and*

Figure 3:
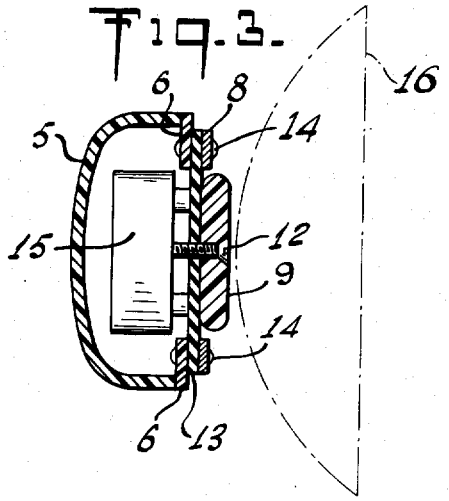

FIGURE 3 is a cross-section view, *to enlarged scale, and on the line 3—3 of FIG. 2* [of said side bow], illustrating the method of securing *the* [said] receiver to said bow, and *of* assembling *the receiver* [it] with its support, *a portion of the head of the wearer, against which the receiver is pressed, being shown broken away.*

On FIG. 1 is shown [, in perspective view,] a pair of hearing aid spectacles, of which the said figure only shows one half, for the sake of simplicity. The front piece 3 of the spectacles, provided, if necessary, with *lenses* [glasses] adapted to the wearer's eyesight, is connected [through the hinge connection 2] to [the] side bow 1 *through a hinge connection 2.* The *bow* [latter], of a curved shape, is provided with an indentation 4 [, which] *where the bow* rests on the external ear of the wearer, *as* [just] in the *case of* [same way as with] ordinary spectacles. The side bow 1 is thick and hollow, to allow inside accommodation of *the elements of the amplifier. The bow may consist* [amplifying elements, and usually consists] of a hollow body 5, open on its inner face (which is that shown on FIG. 1), and having the shape of a groove, on the edges of which a *closure* [closing] plate 6 is secured, by gluing, for instance, said plate covering [said inner face on] the whole of *the* [its] length and width *of said inner face.* The side bow 1 and the plate 6 [,] are made of a plastic material, for instance, cellulose acetate, which may easily be given the proper shape and assembled by gluing.

On FIG. 1 may [still] be seen a small *cover* [lid] 7, which is easily removable, and which *closes* [covers] a hole provided for the inspection and eventual replacement of a dry cell battery for the power supply of the apparatus housed inside *body* 5. On the same figure [1] may also be seen what *may* [will] be called [hereinafter] a "contact button" 9, rigidly secured to the vibrating part of the bone conduction receiver [, and also] *15 which is* housed *within body* [inside] 5.

When the spectacles are worn in the normal way, [this] button *9* engages the head of the wearer, and, more precisely, comes into contact with the *wearer's* [latter's] skin behind his ear, so that the vibrations of the receiver *may* be transmitted to his mastoid temporal bone. The *part* [parts] played by *flange* [elements] 8 and *rivets* 14, also shown on FIG. 1, will be explained in connection with the description of FIG. 2.

FIGURE 2 shows, in a more detailed manner, the right-hand part of FIG. 1. On FIG. 1 firstly appears the already mentioned *cover* [lid] 7. The bone conduction receiver *15* is housed behind [the] button 9, which is rigidly assembled with the vibrating part of said receiver. The assembly of the receiver and of [the] button 9 is placed in an aperture provided *therefor* [therefore] in [the] plate 6. There is no direct mechanical contact between *button* 9 and the edges of this aperture, as the said assembly is secured to said edges through a resilient means, for instance, a rubber sheet *13* stretched on the aperture. *Sheet 13 is* [and itself] held in place on *the* [said] edges *of the aperture* by a thin metal flange 8, itself secured to plate 6 by small hollow rivets, such as 14, or by any other known means. It may also be advantageous to glue [the] said rubber sheet to plate 6.

FIGURE 3 is a cross-section view of the device of FIGURE 2, *as if* [supposed to be] cut by a plane perpendicular to that of FIG. 2, and passing through line 3—3 of the latter. *A portion of the head 16 against which button 9 of the receiver bears is shown in dot-and-dash lines, broken away.* On FIG. 3 is shown the plate 6 closing the hollow body 5 of FIG. 1, which constitutes the side bow of the spectacles. Inside the available free space is the bone conduction receiver 15. On a circular aperture provided in [the closing] plate 6 is stretched [a] rubber sheet 13, secured to said plate 6 by [the] flange 8, and *by* rivets 14 [,] which pass [there] through said rubber sheet 13, [being] possibly *by being* further glued to *plate* 6, as already mentioned. The bone conduction receiver 15, [comes into contact] by its projecting parts, *comes into contact* with the rubber sheet 13, and is rigidly secured to the plastic material button 9 by the central screw 12, which thus assembles *sheet* 13, *receiver* 15 and *button* 9. As shown on FIG. 3, the edge of [the] button 9 is rounded on that *one* of its faces which touches the head of the wearer, to avoid the obvious inconvenience of a sharp edge, while the edge of its other face is bevelled, to reduce the outer diameter of button 9 in the vicinity of the edges of the aperture provided in plate 6, and to prevent accidental contact of said button with said edges, or, more simply, to avoid reducing the resilience of the rubber sheet by its being pinched between said button and *the* aperture edges.

With the arrangements which have just been described by way of example, it is possible, owing to the inertia of the mass of the bone conduction receiver 15 and to its resilient mounting, to transmit the mechanical vibrations developed therein by the amplified microphone currents without at the same time transmitting the said vibrations to the solid material of the side bows and [further] *therethrough* to the microphone.

What I claim is:

1. Combined spectacles and bone conduction hearing aid apparatus, comprising a spectacle frame having two hollow side bows, a microphone housed in one of said side bows, an amplifier, and a bone conduction receiver fed from amplified microphone currents, an aperture on the inner face of the other of said side bows, a rubber sheet covering and stretched on said aperture, a thin metal flange securing said rubber sheet to the edges of said aperture, and means for securing said receiver to said rubber sheet.

2. Apparatus as claimed in claim 1, wherein said rubber sheet is further secured to the edges of said aperture by gluing means 3. Apparatus as claimed in claim 1, wherein said flange is secured to said other of said side bows by rivets.

4. Combined spectacles and bone conduction hearing aid apparatus, comprising a spectacle frame having two hollow side bows, a microphone housed in one of said side bows, an amplifier, and a bone conduction receiver fed from amplified microphone currents, an aperture on the inner face of the other of said side bows, a rubber sheet covering said aperture, means for securing said rubber sheet to the edges of said aperture, and means for securing said receiver to said rubber sheet wherein said receiver is assembled with said rubber sheet by a metal screw rigidly secured to the vibrating part of said receiver.

5. Combined spectacles and bone conduction hearing aid apparatus, comprising a spectacle frame having two hollow side bows, a microphone housed in one of said side bows, an amplifier, and a bone conduction receiver fed from amplified microphone currents, an aperture on the inner face of the other of said side bows, a rubber sheet covering said aperture, means for securing said rubber sheet to the edges of said aperture, and means for securing said receiver to said rubber sheet, wherein a disc-shaped plastic material button is secured to the vibrating part of said receiver.

6. Apparatus as claimed in claim 5, wherein said disc-shaped button is provided with a rounded edge on one of its faces.

7. Apparatus as claimed in claim 5, wherein said disc-shaped button is provided with a rounded edge on one of its faces and with a bevelled edge on the other of its faces.

8. Apparatus as claimed in claim 5, wherein said disc-shaped button is provided with bevelled edges on both of its faces.

9. Apparatus as claimed in claim 5, wherein said disc-shaped button is provided with rounded edges on both of its faces.

*10. A bone conduction hearing aid device, comprising a bone conduction receiver, means for supporting the receiver with relation to the head of a person to be aided by the hearing aid device, the supporting means having a face to be disposed closely adjacent a surface of the person's head, the face having an opening therein, an elastic diaphragm secured with relation to said face to stretch across said opening, the receiver being secured to the diaphragm free of the edges of the opening and being movable with said diaphragm, and means comprising the diaphragm for retaining the receiver pressed into engagement with the person's head.*

*11. A bone conduction hearing aid apparatus, and means for mounting the apparatus with relation to the head of a wearer, the mounting means comprising means to be worn in the manner of eyeglasses and comprising a front frame comprising means for supporting the apparatus on the nose of the wearer, and a pair of side bows comprising means for supporting the apparatus upon the ears of the wearer and being constructed to provide housings, hearing aid elements positioned in said housings, the elements comprising a microphone, an amplifier, and a bone conduction receiver, one of the bows being formed to provide a chamber having an aperture opening therefrom, the aperture being positioned to face toward the head of the wearer when the mounting means is worn, the bone conduction receiver being disposed at said aperture, and elastic means engaging said one bow only at edges of the aperture and being under tension, and means comprising the elastic means for retaining the receiver within the aperture free of the walls of the chamber and to extend the receiver from the aperture to engage a portion of the receiver against the head of the wearer when the mounting means is worn.*

*12. A bone conduction hearing aid apparatus, and*

*means for mounting the apparatus with relation to the head of a wearer, the mounting means comprising means to be worn in the manner of eyeglasses and comprising a front frame comprising means for supporting the apparatus on the nose of the wearer, and a pair of side bows comprising means for supporting the apparatus upon the ears of the wearer and being constructed to provide housings, hearing aid elements positioned in said housings, the elements comprising a microphone, an amplifier, and a bone conduction receiver, one of the bows being formed to provide a chamber having an aperture opening therefrom, the aperture being positioned to face toward the head of the wearer when the mounting means is worn, the bone conduction receiver being disposed at said aperture, and elastic means secured to said one bow only at and extending from the edges of the aperture, the elastic means being under tension and supporting the receiver, the elastic means and the receiver being assembled with the receiver within and extending from the aperture, so as to engage a portion of the receiver against the head of the wearer when the mounting means is worn.*

*13. A bone conduction hearing aid apparatus, and means for mounting the apparatus with relation to the head of a wearer, the mounting means comprising means to be worn in the manner of eyeglasses and comprising a front frame comprising means for supporting the apparatus on the nose of the wearer, and a pair of side bows comprising means for supporting the apparatus upon the ears of the wearer and being constructed to provide housings, and hearing aid elements positioned in said housings, the elements comprising a microphone, and an amplifier, one of the bows being formed to provide a chamber having an aperture opening therefrom, the aperture being positioned to face toward the head of the wearer when the mounting means is worn, an elastic sheet secured to extend across the aperture, and a bone conduction receiver mounted on and retained by said sheet, and means comprising the sheet for supporting the receiver completely free of any vibration-transmitting contact with the walls of the chamber, the sheet providing means for pressing the receiver against the head of the wearer.*

*14. A bone conduction hearing aid apparatus, and means for mounting the apparatus with relation to the head of a wearer, the mounting means comprising means to be worn in the manner of eyeglasses and comprising a front frame comprising means for supporting the apparatus on the nose of the wearer, and a pair of side bows comprising means for supporting the apparatus upon the ears of the wearer and being constructed to provide housings, hearing aid elements positioned in said housings, the elements comprising a microphone, and an amplifier, one of the bows being formed to provide a chamber having an aperture opening therefrom, the aperture being positioned to face toward the head of the wearer when the mounting means is worn, an elastic sheet secured to extend across the aperture, and a bone conduction receiver mounted on and extending through said sheet, and means comprising the sheet for supporting the receiver completely free of any vibration-transmitting contact with the walls of the chamber, the sheet providing means for pressing the receiver against the head of the wearer by said sheet.*

*15. A bone conduction hearing aid apparatus, and means for mounting the apparatus with relation to the head of a wearer, the mounting means comprising means to be worn in the manner of eyeglasses and comprising a front frame comprising means for supporting the apparatus on the nose of the wearer, and a pair of side bows comprising means for supporting the apparatus upon the ears of the wearer and being constructed to provide housings, and hearing aid elements positioned in said housings, the elements comprising a microphone, and an amplifier, one of the bows being formed to provide a chamber having an aperture opening therefrom, the aperture being positioned to face toward the head of the wearer when the mounting means is worn, an elastic sheet secured at the edges of and extending across the aperture, and a bone conduction receiver mounted on and extending through said sheet, and means comprising the sheet for supporting the receiver completely free of any vibration-transmitting contact with the walls of the chamber, the sheet providing means for pressing the receiver against the head of the wearer.*

*16. A bone conduction hearing aid apparatus, and means for mounting the apparatus with relation to the head of a wearer, the mounting means comprising means to be worn in the manner of eyeglasses and comprising a front frame comprising means for supporting the apparatus on the nose of the wearer, and a pair of side bows comprising means for supporting the apparatus upon the ears of the wearer and being constructed to provide housings, hearing aid elements positioned in said housings, the elements comprising a microphone, and an amplifier, one of the bows being formed to provide a chamber having an aperture opening therefrom, the aperture being positioned to face toward the head of the wearer when the mounting means is worn, an elastic rubber sheet secured at the edges of and extending across the aperture, and a bone conduction receiver mounted on and extending through said sheet, and means comprising the sheet for supporting the receiver completely free of any vibration-transmitting contact with the walls of the chamber, the sheet providing means for pressing the receiver against the head of the wearer.*

*17. A bone conduction hearing aid apparatus, and means for mounting the apparatus with relation to the head of a wearer, the mounting means comprising means to be worn in the manner of eyeglasses and comprising a front frame comprising means for supporting the apparatus on the nose of the wearer, and a pair of side bows comprising means for supporting the apparatus upon the ears of the wearer and being constructed to provide housings, hearing aid elements positioned in said housings, the elements comprising a microphone, and an amplifier, one of the bows being formed to provide a chamber having an aperture opening therefrom, the aperture being positioned to face toward the head of the wearer when the supporting means is worn, an elastic sheet secured to extend across the aperture, and a bone conduction receiver having a member for engaging the head of the wearer, the head engaging member and the body of the receiver being secured to and disposed on opposite sides of the sheet, and means comprising the sheet for supporting the head engaging member externally of the chamber in position to engage against the head of the wearer.*

References Cited in the file of this patent or the original patent

UNITED STATES PATENTS

| | | |
|---|---|---|
| 2,417,153 | Dorr | Mar. 11, 1947 |
| 2,718,563 | Nicholidies | Sept. 20, 1955 |
| 2,733,302 | Geib et al. | Jan. 31, 1956 |
| 2,794,075 | Morgan | May 28, 1957 |
| 2,874,230 | Carlson | Feb. 17, 1959 |

FOREIGN PATENTS

| | | |
|---|---|---|
| 723,981 | Great Britain | Feb. 16, 1955 |
| 737,115 | Great Britain | Sept. 21, 1955 |
| 541,987 | Italy | Apr. 12, 1956 |